United States Patent Office.

LEONHARD SCHMIDT AND FRED. E. HELD, OF CHICAGO, ILLINOIS.

Letters Patent No. 92,657, dated July 13, 1869.

STENCILLING-APPARATUS.

The Schedule referred to in these Letters Patent and making part of the same.

*To all whom it may concern:*

Be it known that we, LEONHARD SCHMIDT and FRED. E. HELD, of Chicago, in the county of Cook, and State of Illinois, have invented certain new and useful Improvements in Stencilling-Apparatus; and we do hereby declare that the following to be a full, clear, and exact description thereof, reference being had to the accompanying drawings, making part of this specification, and to the letters of reference marked thereon, like letters indicating like parts, wherever they occur.

To enable others skilled in the art to construct and use our invention, we will proceed to describe it.

Our invention relates to stencilling-devices, and consists in a novel manner of constructing and arranging a frame for holding the stencil, brush, ink, and water in a convenient and ready form for use, and also in constructing, in connection with said frame, a box, provided with compartments for extra stencils, and to hold the frame when folded.

In the drawings—

Figure 1 is a view of the stencilling-frame, ready for use;

Figure 2, a vertical cross-section of the frame, folded for packing in the box; and Figure 3 is a top-plan view of the box open, and with the frame packed therein.

A represents the stencil-frame complete, and

B, the box to contain it, when folded for transportation, &c.

The frame A we construct of three or more small oblong frames, $a$, $b$, and $c$, hinged together at their sides, so that they may be extended flatwise, as shown in fig. 1, or folded down upon one another, as shown in figs. 2 and 3, the frame $a$ having attached rigidly to its outer side a block or box, $e$.

Along in the inner parallel sides of the frames $a$, $b$, and $c$ we form grooves, or rabbets $n$, as shown in fig. 2, and cut mortises out through the end of each of the frames, in line with the said grooves, as shown in fig. 1.

Through the mortises in the frames we insert the desired stencil-letters, and slide them along into the grooves in the frames; also placing, at either or both ends of them, blanks or quads $m$, to fill out to the ends of the frames, and keep the letters in the required positions, as shown in figs. 1 and 3.

After inserting the letters and quads, we shove into the mortises blocks $o$, and, after crowding them tightly against the stencils, fasten them by thumb-screws $k$, provided for the purpose, as seen in fig. 1, thus holding the stencils securely and rigidly in position.

We also provide a handle, $p$, of the form shown, which is provided with two screws, $q$, for attaching it to the frame A, when the same is extended.

This handle serves to hold and manipulate the frame, and also to keep it extended perfectly flat, as shown in fig. 1.

In the block $e$ we form three compartments, one to contain the block of ink $f$, and the remaining two, $h$ and $i$, to contain the water and marking-brush, respectively.

In the ink-box we place an L-shaped piece, $g$, lying under and against one side of the block, as shown in fig. 2.

This piece $g$ may be raised in the box, and secured by means of set or thumb-screws $j$, entering through the outer side, the object of this arrangement being to elevate the block of ink as it wears away or is used up.

An opening, $s$, is made through the bottom of the ink-box, for the purpose of pushing up the ink from below.

When the frame is extended and the handle attached, as shown in fig. 1, the device forms a very light and convenient marking-apparatus, which may be held by one hand grasping the handle, while the other, and right hand, is left free to manipulate the brush.

The letters or stencils may be changed by loosening the thumb-screws $k$, and removing the blocks $o$, after which the letters may be withdrawn.

The extra stencils and quads are kept in compartments $r$, arranged in the box B, as shown in fig. 3.

When the apparatus is to be placed away or transported, the handle $p$ is detached and the frame folded, as in fig. 2. The frame and handle are then placed in the box, as shown in fig. 3, and the cover shut down, thus enclosing the whole, and protecting it from dirt or injury.

It is evident that more or less than three of the small frames may be used, and that, instead of screws, any other suitable devices may be used to fasten the handle $p$ to the frame.

Having thus described our invention,

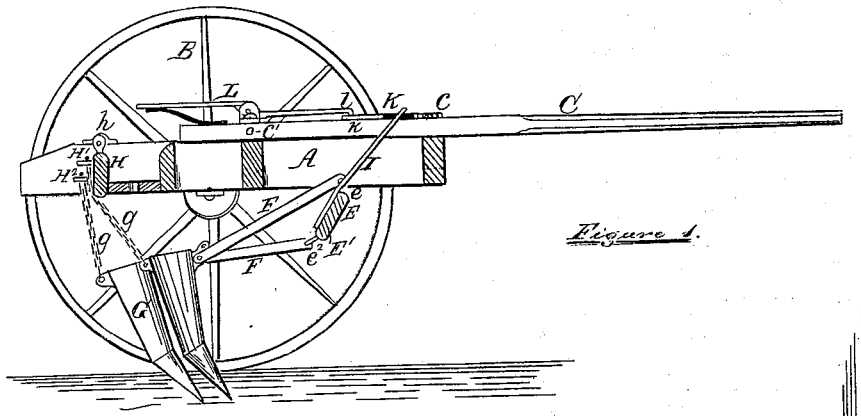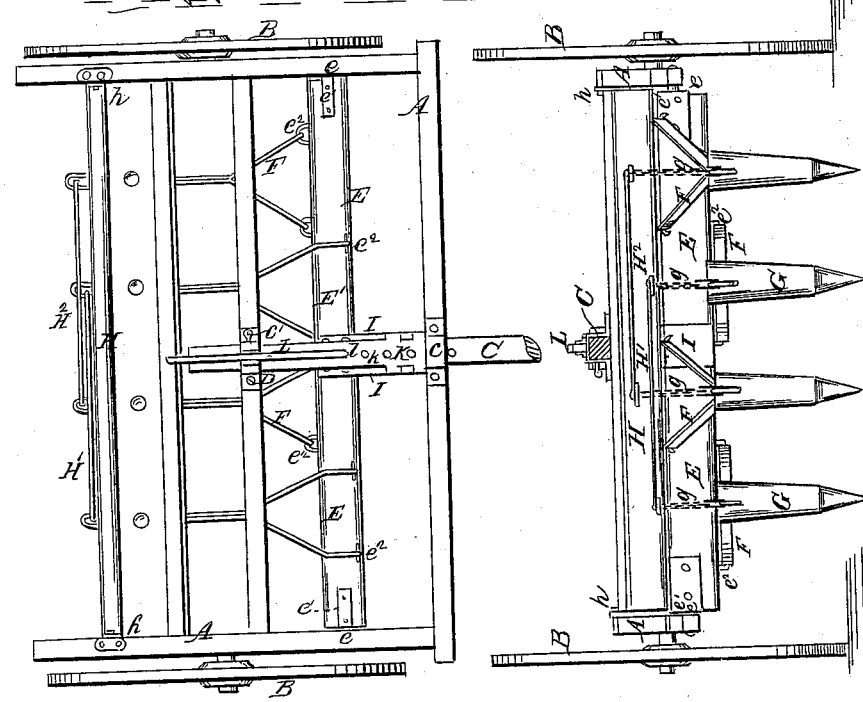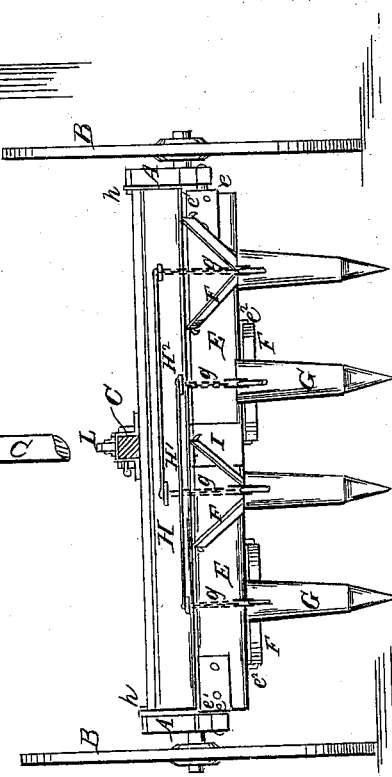

What we claim, is—

1. A stencil-apparatus, consisting of the frame A, made up of the oblong hinged frames $a$, $b$, and $c$, box $e$, and detachable handle $p$, when constructed and arranged substantially as described, for the purpose set forth.

2. The combination of the frame A with the box B, provided with the compartments $r$, when constructed and arranged substantially as and for the purpose set forth.

LEONHARD SCHMIDT.
FRED. E. HELD.

Witnesses:
WM. H. LOTZ,
H. FISCHBECK.